INVENTOR.
LAWRENCE E. REDMAN

Dec. 31, 1968    L. E. REDMAN    3,419,377
METHOD FOR TREATING ORGANIC AND INORGANIC WASTE MATERIAL
Original Filed Feb. 9, 1962    Sheet 2 of 4
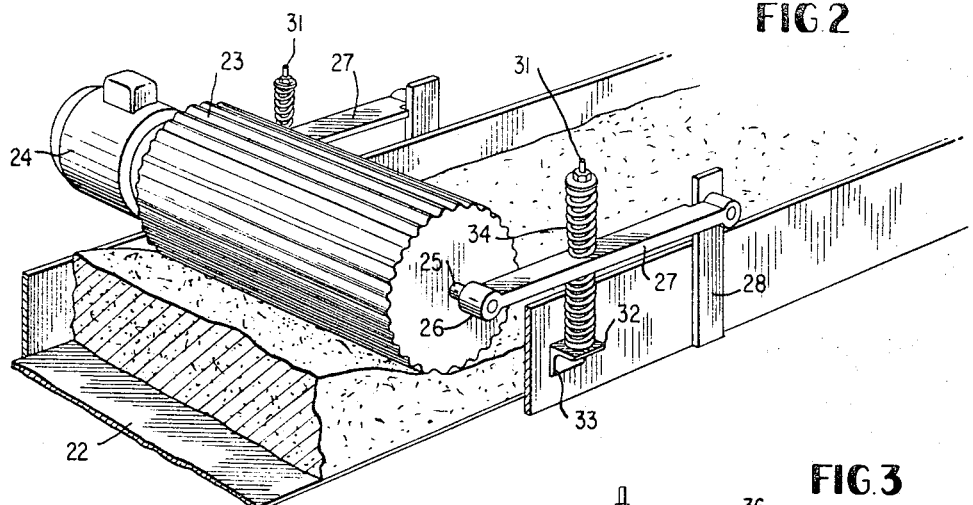
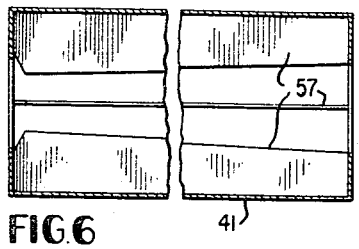
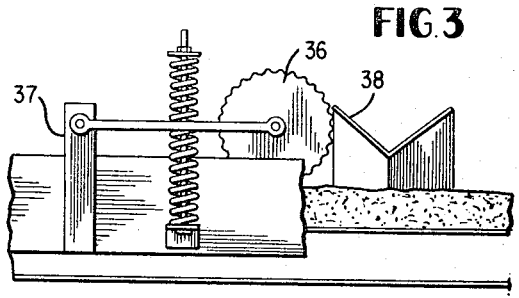
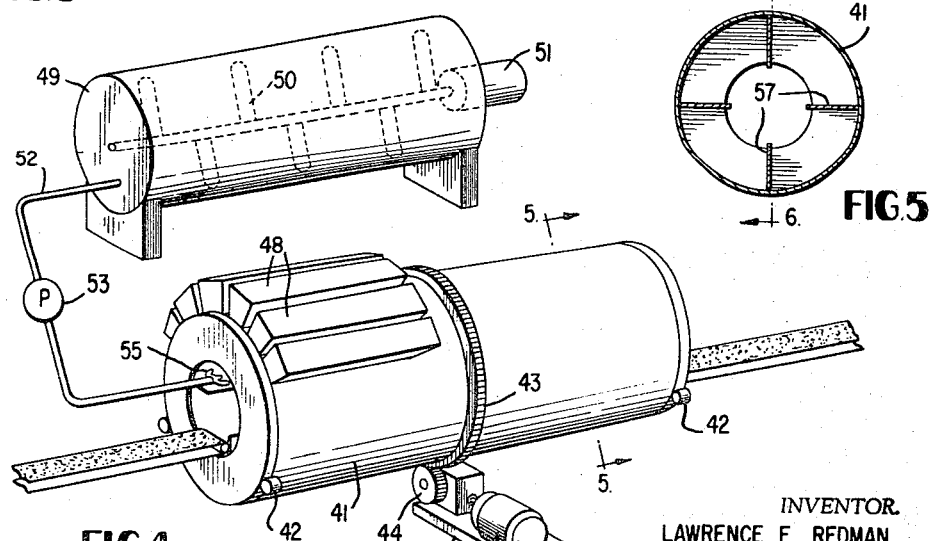
INVENTOR.
LAWRENCE E. REDMAN
BY
Kemon, Palmer, Stewart & Estabrook
ATTORNEYS

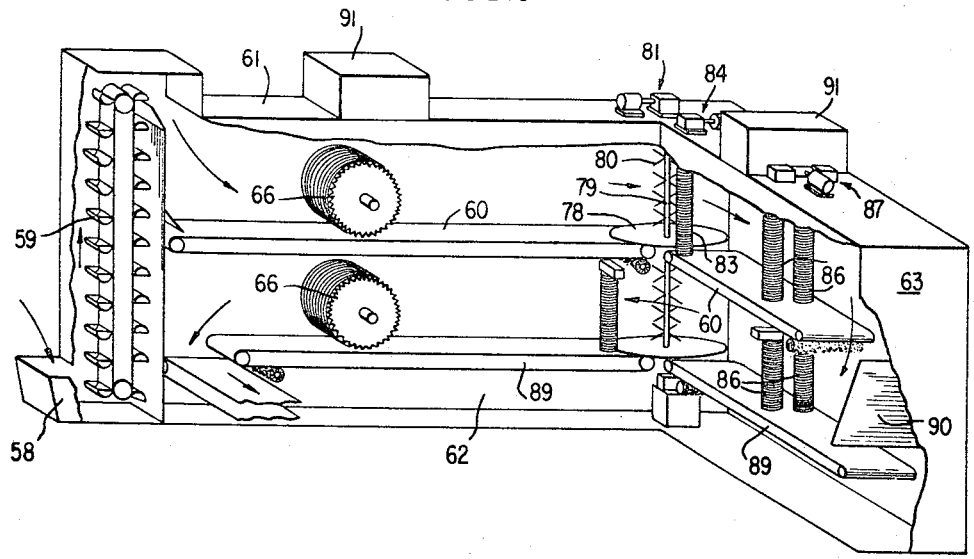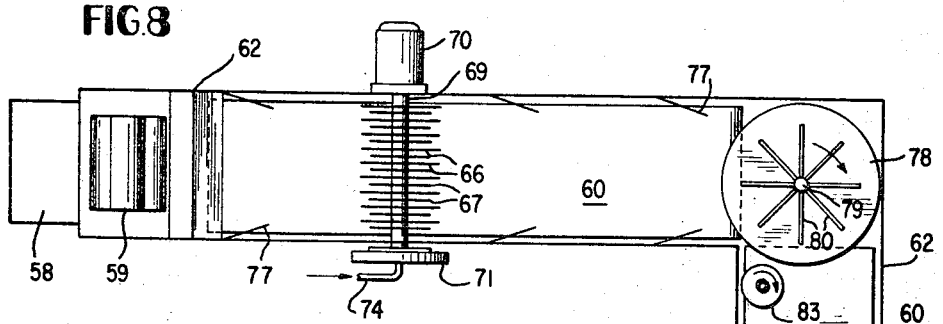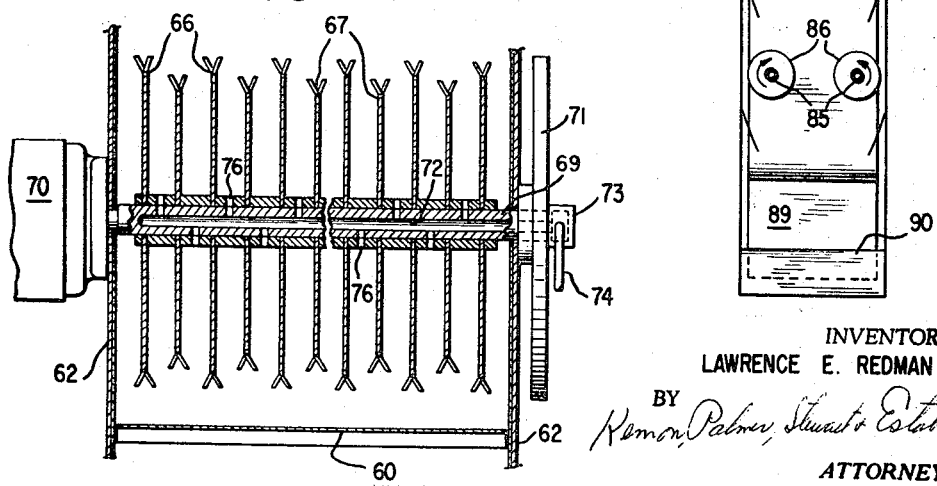

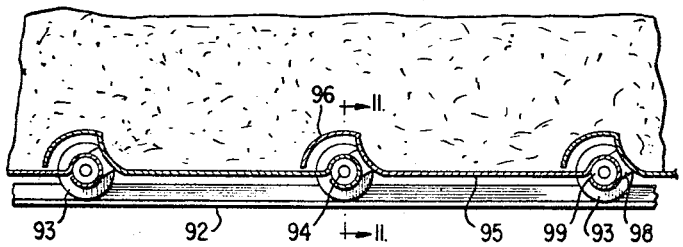
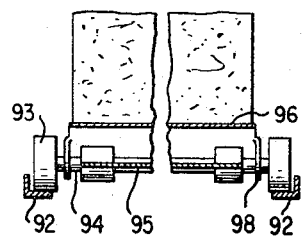
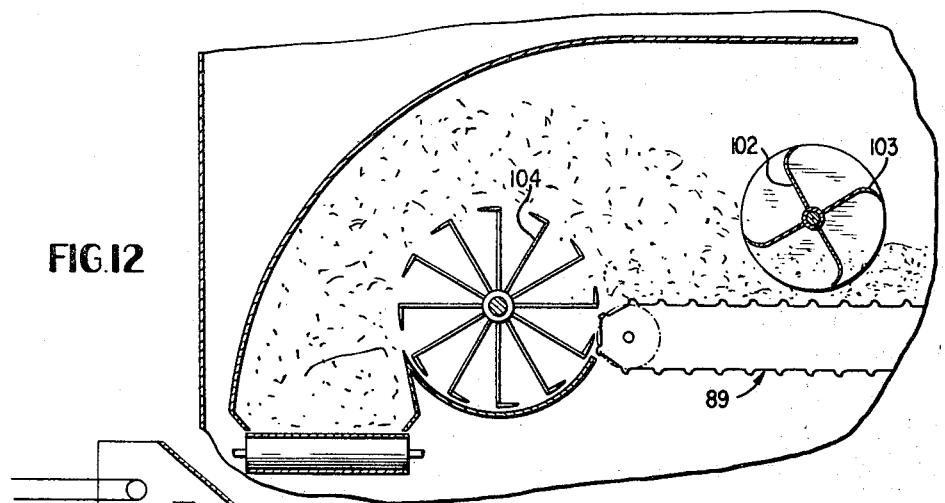
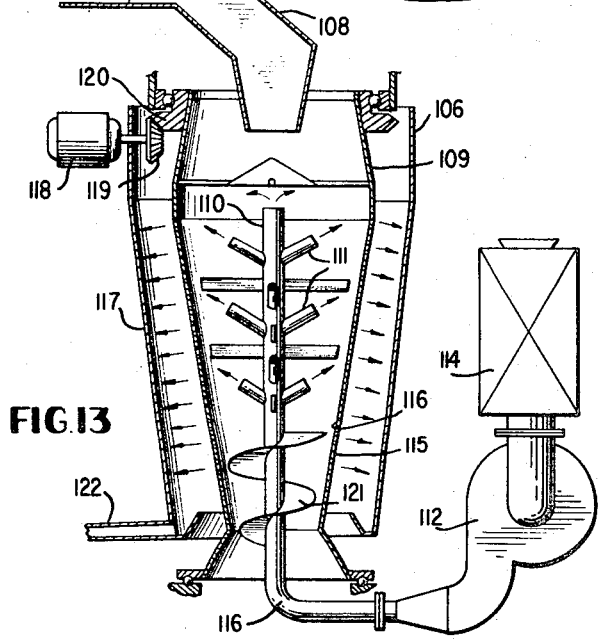
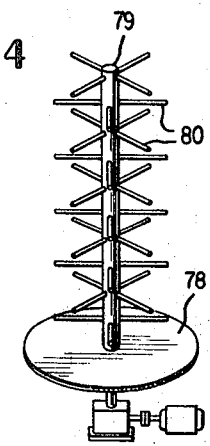
INVENTOR.
LAWRENCE E. REDMAN

United States Patent Office 3,419,377
Patented Dec. 31, 1968

3,419,377
METHOD FOR TREATING ORGANIC AND INORGANIC WASTE MATERIAL
Lawrence E. Redman, Phoenix, Ariz., assignor, by mesne assignments, to Garbage Service Company, Inc., Phoenix, Ariz., a corporation of Arizona
Original application Feb. 9, 1962, Ser. No. 172,300, now Patent No. 3,246,954, dated Apr. 19, 1966. Divided and this application Apr. 7, 1965, Ser. No. 446,299
4 Claims. (Cl. 71—9)

This application is a division of my copending application Ser. No. 172,300, filed Feb. 9, 1962, now Patent No. 3,246,954.

This invention relates to an improved method and apparatus for composting waste materials containing organic and inorganic constituents, such as municipal refuse and the like.

The disposing of municipal refuse in many cities and towns is usually carried out by one of several processes such as by a land-fill operation or through the use of a city dump or by an incinerator. The refuse that is collected in a city, town, municipality or the like consists not only of garbage and similar matter but also various and sundry types of waste materials commonly collected from homes, business establishments, restaurants and hotels, wherein said waste materials are usually items which are commonly disposed of in the normal operation of such establishments. In the disposing of refuse and the like by means of a city dump, it has been found time and again that such an operation not only is an eyesore, but is also one that soon becomes a health nuisance and hazard. In addition to the foregoing, a city dump is usually regarded as being an economic waste, inasmuch as no end product is obtainable therefrom which could result in a saleable item. A land-fill or incinerator operation are in nowise better than a city dump as far as realizing an end product from the collection and disposing of municipal refuse. In each and every one of the aforementioned instances, the municipal refuse is either burned or destroyed, so that a usable end product is not obtainable.

In recent years, various and sundry efforts have been directed to processes for the treatment of municipal refuse in order to obtain a humus or soil nutrient therefrom as an end product. In many of the processes and apparatuses that have been devised heretofore for the express purpose of disposing of municipal refuse, it has been found that for one reason or another, they have not been entirely satisfactory. One process that has been resorted to is an anaerobic process. While such a process has been found to be effective as far as producing a humus or soil nutrient is concerned, it has been ascertained that this type of process produces a very objectionable gas that permeates the surrounding atmosphere. Another process which has been followed to a greater degree has been an aerobic process which, through controlled atmosphere, has prevented the formation and creation of objectionable gases and other odors in the disposing of the municipal refuse so as to realize a saleable end product.

While the aerobic process has been adapted and followed in many installations for disposing of municipal refuse, numerous problems have, of course, developed. In the greater majority of instances, the problems that have arisen seem to stem from or originate in the apparatus that is employed for carrying out said process. In some installations, the design of the apparatus has been such as to require a rather extensive period of time in which to complete the fermentation of the waste materials, while in other installations the heat generated from the bacterial action of the waste materials during the fermentation period has occasioned rather disastrous results to the appartaus.

Although certain efforts have been expended in composting waste material by an aerobic process toward controlling and regulating the apparatus employed, it has been found in many instances that said apparatus for one reason or another has not been entirely satisfactory. As an illustration, a theory has been advanced that in composting by the aerobic process the apparatus should be so designed that the waste material should be permitted to lie in a substantially dormant condition for certain prescribed periods of time. Another theory that has also been advanced is that while lying in a dormant condition, the waste material to be composted should be subjected to a controlled atmospheric condition to enhance the fermentation thereof. While such theories for all apparent purposes appear to be sound, the particular apparatus utilized in carrying them out have not in all instances been fully capable of accomplishing the intended purposes.

The process constituting the basis of the present invention tends to be somewhat at a variance in several aspects as regards the processes utilized or followed heretofore. One of the differences is that the present invention is predicated upon the premise that the waste material to be composted should be thoroughly agitated and mixed and remixed at periodic intervals during the fermentation operation rather than lie in a so-called dormant condition. In addition the present invention discloses that the waste material should be subjected to the introduction of water or other suitable liquids such as sludge during the fermentation thereof for the purpose of controlling and maintaining the temperature within certain desired ranges during said fermentation period.

One of the objects of the present invention is to compost waste material by a process wherein said material is thoroughly pulverized and then mixed and moistened for initiating fermentation thereof prior to its delivery to a digestor chamber.

Another object is to provide an apparatus for composting waste materials which are delivered in a thoroughly mixed and moistened condition to a digestor chamber for the fermentation thereof and wherein said waste materials are cut, agitated, aerated and mixed to produce particles of waste material that will be thoroughly subjected to fermentation.

Another object is to provide an apparatus having rotating cutting and agitating members positioned in the flow path of the waste material for periodically chopping, severing, mixing and redistributing said waste material on a conveyor for increasing a thorough fermentation of said material.

Another object is to provide an apparatus for the composting of waste material, which apparatus is highly efficient and economical of operation and which is continuous and capable of composting said material within a relatively short period of time.

Other objects and advantages, more or less ancillary to the foregoing in the manner in which all of the objects are realized, will appear in the following description which, when considered in connection with the accompanying drawing, sets forth the preferred embodiment of the invention. Referring to the drawings wherein the preferred embodiment of the invention is illustrated:

FIG. 2 is a perspective view of the forward portion of a picking belt with an automatic feeder mechanism mounted thereon;

FIG. 3 is a side elevational view of a portion of the picking belt showing a magnetic picking drum and delivery chute associated therewith;

FIG. 4 is a perspective view of a mixing drum with a water storage reservoir therefor;

FIG. 5 is a cross-sectional view of a portion of the mixing drum showing the blades mounted therein, said figure being taken on the line 5—5 of FIG. 4;

FIG. 6 is an elongated detailed view showing the blades secured within the mixing drum, said view being taken on the line 6—6 of FIG. 5;

FIG. 7 is a side elevational view of one of the digestor chambers illustrated in FIG. 1 with portions of the housing being removed in the interest of clarity;

FIG. 8 is a top plan view of the digestor chamber shown in FIG. 7 with the top of the housing being removed therefrom;

FIG. 9 is an enlarged detailed view of one of the rotary cutting members shown in FIGS. 7 and 8;

FIG. 10 is a side elevational view of a portion of one of the conveyors positioned within the digestor chambers;

FIG. 11 is a vertical sectional view of the conveyor, the section being taken on the line 11—11 of FIG. 10;

FIG. 12 is a side elevational view of the discharge end portion of the third digestor chamber showing the cooperating rotary agitating members postioned at the end of the conveyor in said chamber;

FIG. 13 is a vertical elevational view of a rotary spin drier having heating means; and FIG. 14 is a detailed showing of a rotary agitator positioned within the digestor chamber.

Figure 1:
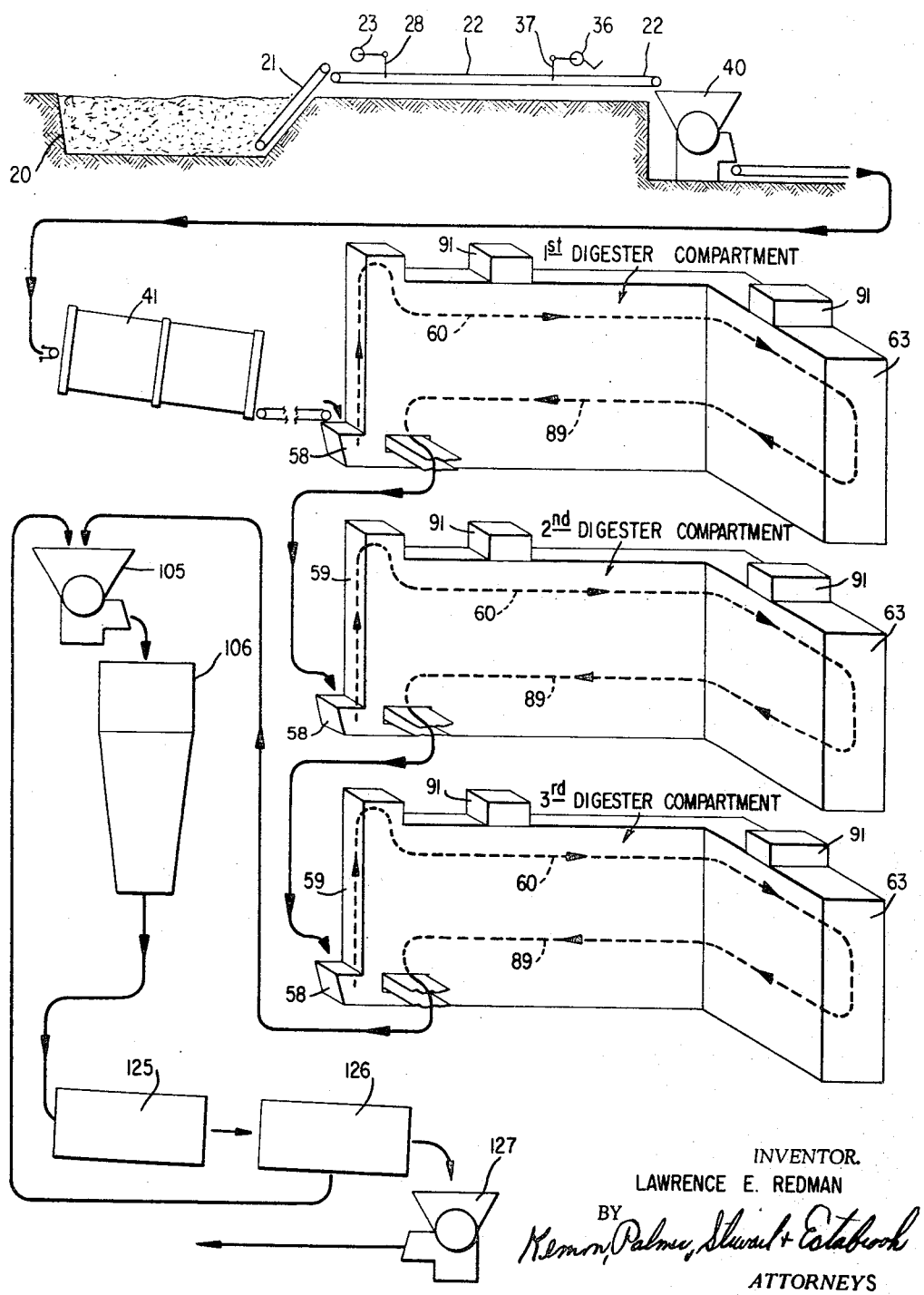
FIG. 1 is a schematic flow chart illustrating the present invention.

Referring to the drawings, there is shown in FIG. 1 a hopper 20 for receiving the municipal refuse and waste products that are delivered by the usual refuse collection trucks, not shown.

The waste material that is to be composted is moved from the hopper 20 by an endless conveyor 21 for delivery to an endless conveyor 22. The conveyor 22 constitutes the picking station and by moving at a very slow speed permits any and all salvagable items to be removed and sorted by various operators as the waste material moves through the station. The conveyor 22, FIGS. 1 and 2, has mounted at its forward end a metering drum 23 which has a motor 24 associated therewith for rotating said drum at a constant speed. The motor 24 is provided with a drive shaft 25 upon which the drum 23 is mounted and the ends of the shaft 25 are supported in suitable bearings 26 carried by arms 27 that are pivotally mounted upon vertical supports 28 positioned at the sides of the picking conveyor 22. The arms 27 each have an elongated rod 31 extending through the central portion thereof in a plane normal thereto with one end of the rod being secured to a suitable bracket 32 mounted at the side of the conveyor. The rod 31 has positioned thereon intermediate the bracket 32 and the arm 27 a coil spring 33, while a similar spring 34 is mounted on said rod between the upper surface of the arms 27 and the top of the rod. The springs 33 and 34 permit the metering drum 23 to be moved either towards or away from the conveyor 22 in order to control the flow of material over and along said picking conveyor while at the same time permitting large and bulky items to move beneath said roller.

The conveyor 22 also has associated therewith, adjacent the discharge end thereof, a magnetic picking drum 36 which is rotatably driven by a suitable motor, not shown, and the drum 36 is also spring mounted upon suitable supports 37 in the same manner as drum 23. The magnetic picking drum 36 may be energized by any suitable means whereby said drum will remove from the waste material carried by the conveyor 22 substantially all metallic items passing under said drum and particularly items that might be overlooked by the picking operators stationed along the sides of the conveyor 22. The items and material removed from the waste material on said conveyor by said magnetic drum will adhere to the peripheral surface of the drum and said drum has a scraping member 38 associated therewith which is in the form of a chute for removing said material from the drum and delivering same to a suitable receptacle, not shown, disposed adjacent the side of the conveyor 22.

The municipal refuse and waste material is discharged from the conveyor 22 into a grinder 40 where the material to be composted is ground to produce particles of substantially uniform size. The ground waste material is then conveyed or delivered to an elongated rotary mixing drum 41 which is of cylindrical configuration and supported at its respective ends in suitable roller bearings 42. The drum 41 has its longitudinal axis slightly inclined with respect to the horizontal so that the entry end of the drum is higher than the discharge whereby the waste material will have, to a certain degree, a gravity feed therethrough. The drum 41 has an annular gear 43 secured to its peripheral surface which is engaged by a pinion 44 that is rotatably driven by a motor 45 mounted on a suitable support 46. Thus, upon actuation or energization of the motor 45, the pinion 44 will be driven and, in turn, rotate the drum 41 through gear 43, which movement will permit the drum to rotate upon the supporting rollers or bearings 42 for the purpose of mixing the ground waste material. A plurality of radiant heating units 48, carried by suitable supports, not shown, are positioned about a portion of the outer circumferential surface of the drum 41 between the annular gear 43 and the entrant end of the drum. The heating units are so positioned with respect to the outer surface of the drum 41 that said drum will be capable of rotating beneath the heating units so that the forward or entrant end portion of said drum will be uniformly heated during its rotative movement. The drum 41 has positioned adjacent thereto on suitable supports, a water storage tank 49 which is provided with a heating unit, not shown, for maintaining the water within said tank at a desired temperature. The tank 49 is provided with a stirrer or agitator 50 that is driven by a motor 51 for insuring that any newly added water will be thoroughly mixed with the heated water within the tank so that any water delivered from said tank 49 through a conduit 52 by means of a pump 53 to the mixing drum 41, will be at a desired uniform temperature at all times.

The water from the storage tank 49 is sprayed upon the waste material within the forward portion of the mixing drum 41 by a nozzle 55 so that by introducing heated water in conjunction with the heated drum the temperature of the ground waste material will be raised so as to initiate or start the fermentation process thereof. The temperature of the water in the tank 49 is thermostatically controlled and the heating units 48 are also thermostatically controlled so that the temperature within the forward portion of the drum 41 in which the waste material is being moistened and mixed may be not only controlled but also adjusted dependent upon the surrounding atmospheric conditions and temperatures. Thus, the conditions of the atmosphere in the vicinity of a composting plant will determine to some degree the temperature of the drum as well as that of the water while also determining to a degree the amount of water that should be added to the waste material in order to obtain a thoroughly mixed and moistened mass of material wherein fermentation may be initiated during the mixing thereof. As the drum 41 is driven by the motor 45 and pinion 44, the heated and moistened waste material is being thoroughly mixed and at the same time is being moved from the entrant end of the drum toward the discharge end thereof by inwardly projecting blades 57, FIG. 6, which are disposed in a sloping or inclined relation with respect to the longitudinal axis of the drum from the entrant and toward the discharge end. The inclination of the drum 41 and the taper or slope of the blades 57 will insure the moving of the waste material towards the discharge end of the drum while the blades insure a continuous and thorough mixing of the ground waste material.

The thoroughly mixed waste material, which is in the initial stages of fermentation as it leaves the mixing drum 41, is delivered to a suitable hopper or receptacle 58 which has associated therewith an endless bucket elevator 59 that is mounted in one end of a first digestor compartment. The waste material is discharged from the bucket elevator onto one end of an endless conveyor 60 mounted in the upper portion of the first digestor compartment. The digestor compartment consists of an enclosed housing having a top 61, side walls 62 and end walls 63. While the digestor compartment is shown in FIGS. 7 and 8, as being in a right angular relation with respect to itself, it is readily apparent that said compartment could be of elongated configuration and the disclosure of the present application is simply an illustration of one form of digestor compartment. The inner surface of the side walls 62 of the digestor compartment are coated with glass or enamel 65 or some similar material to provide an extremely hard wear-resistant surface and one which would materially restrict or prevent corrosion thereof. In addition, the coating 65 will provide an extremely smooth surface which will not permit waste material to adhere thereto as it is being conveyed through the various stages within the digestor compartment.

As shown in FIGS. 7 and 8, the conveyor 60 has associated therewith a plurality of saw or cutting members or blades 66 and 67 which are mounted on and carried by a shaft 69, that is disposed in a plane normal to the path of movement of said conveyor. The saw or cutting members 66 and 67 are mounted in spaced parallel relation with one another on the shaft 69 and extend transversely of the conveyor 60 so as to engage the waste material as same is carried by said conveyor. The shaft 69 has one end operatively connected to a motor 70 that is suitably mounted upon one of the side walls 62 of the digester compartment. The shaft 69 has mounted on the end thereof opposite the motor 70 and externally of the other side wall 62 of the digestor compartment, a flywheel 71 which will insure the proper rotative momentum for the saw blades 66 and 67. The flywheel will insure that the blades or members 66 and 67 will continue to rotate through the drive of the motor to engage the waste material as it is moved along by the conveyor 60 for cutting and chopping and severing said material.

The shaft 69 is formed with an internal passageway 72 that extends inwardly along the longitudinal axis of said shaft from the fly wheel end thereof, which end of the shaft is provided with a fitting 73 that has extending therefrom a tubular conduit 74 which is in fluid communication with said passageway. The fluid conduit 74 is connected to a supply of liquid under pressure and a suitable control, not shown, is interposed in the conduit and actuated by the temperature within the digestor compartment for controlling the amount of water that is delivered to the fluid passageway 72. The shaft 69 has radiating from the passageway 72 a plurality of orifices 76 which are interposed between adjacent saw or cutting blades 66 and 67 for the purpose of delivering moisture to the waste material as it is engaged by the saws 66 and 67 to enhance the fermentation thereof. As the waste material is carried along by the conveyor 60, it will be shaped and formed upon the conveyor by baffles 77 provided on the interior surface of the side walls 62 of the digestor compartment. The shaping and forming of the waste material will insure that it is slightly spaced from the inner surface of the side walls 62, thereby permitting the circulation of streams of air over, around and through the waste material as it is moved along by the conveyor.

The first digestor compartment has positioned therein approximately midway of the length of the conveyor 60 a rotatable table 78 which is secured to and carried by a shaft 79 that is provided with a plurality of radiating arms 80, FIG. 14. The rotatable table 78 and radiating arms 80 are secured to the shaft 79, which is mounted in suitable bearing supports in the digestor compartment and a motor 81, rotatably drives said shaft at a constant speed at all times. The rotation of the shaft 79 by the motor 81 will cause the waste material to be engaged by the radially extending arms 80 as said waste material is moved by the conveyor 60 onto the rotatable table 78. The arms 80, in conjunction with the rotative movement of the table, will thoroughly agitate, fluff, break up, and tend to pulverize to some degree, the waste material while at the same time delivering said waste material into the path of movement of a plurality of saw or cutting blades or members 83 that are mounted on a vertically extending shaft disposed at one side of the conveyor 60 within the digestor compartment. The saw blades or members 83 will engage the waste material to further cut, shred and chop into a pulverized condition. The blades or members 83 are mounted on a shaft in the same manner as the saw blades or members 66 and 67 except that the blades 83 are disposed horizontally in spaced parallel relation to one another on a vertically extending shaft so as to lie in planes parallel to the plane of the conveyor 60. The saw blades or members 83 are rotatably driven by means of a motor 84, and, in addition, the shaft upon which the saw blades are mounted is provided with a passageway, not shown, for the purpose of delivering water or suitable moistening means to the waste material in the same manner and for the same purpose that moisture is delivered to the waste material upon the engagement of said material by the saw blades 66 and 67. The baffles 77 have positioned adjacent thereto thermostats, not shown, of conventional type for controlling the delivery of water to the cutting saw blades or members, so that, dependent upon the degree of temperature within the digestor compartment, the thermostats will control the amount of water that is delivered to the shaft upon which the saw blades are mounted. The conveyor 60 has associated therewith adjacent its discharge end a pair of vertically disposed shafts 85 which have mounted thereon in spaced parallel relation a plurality of horizontally disposed saw blades 86. The shafts 85 are rotatably driven by a suitable motor 87 mounted on the top of the digestor compartment. The shafts 85 with the saw blades 86 mounted thereon are driven in opposite directions to one another, that is, one shaft is rotated in a clockwise direction while the other shaft is rotated in a counterclockwise direction. As the waste material is moved into the area of the rotating blades or cutting members 86, it will not only be chopped, cut, severed and agitated, but the central portion of the waste material on the conveyor will be thrown outwardly towards the sides of the digestor compartment while the material disposed along the outer edge portions of the conveyor will be moved inwardly so that said waste material will tend to be mixed and rearranged on the conveyor 60 so as to present new areas of waste material to fermentation. The continued movement of the conveyor 60 will cause the waste material to be discharged from the end of the conveyor onto the upper surface of a conveyor 89 disposed beneath the conveyor 60 within the lower portion of the digestor compartment. The end wall 63 of the digestor compartment has mounted on the inner surface thereof a baffle or guide plate 90 for directing the waste material onto the upper run or surface of the lower conveyor 89. The saw blades 86 and shafts 85 are identical in all respects with the shaft 69 and blades 66 and 67, so that water or liquid will be delivered to the shafts 85 for the purpose of further moistening the waste material as it is moved through the digestor compartment by the conveyor 60. The delivery of water or a liquid such as sludge, to any of the saw or cutting blade devices is, of course, dependent upon the temperature within the digestor compartment and this temperature is determined by suitable thermostats mounted at strategic points within the digestor compartment.

The lower conveyor 89 is provided with vertically and horizontally disposed saw or cutting members in the same manner and location as the conveyor 60 so that the waste material is subjected to the same type of action as it is moved through the second stage of fermentation by means of the conveyor 89 The top wall 61 of the digestor compartment or housing has mounted thereon, at spaced points, evaporative coolers 91 for introducing controlled air to the interior of the digestor compartment to insure that the proper fermentation temperature is being maintained therein. The evaporative coolers 91 are operatively controlled by suitable thermostats positioned at strategic points within the digestive compartment. Thus, the amount of atmospheric air that is being introduced into said digesting compartment will be dependent upon the temperature within the compartment which in fact will be the temperature of the fermenting waste material.

The digestor compartment has mounted on the inner surface of the side walls 62 suitable trackways 92 upon which are rotatably mounted rollers 93 that are connected to one another by a shaft 94 which in turn supports pan-like elements 95. The pan-like elements 95 have an arcuate-shaped segmental portion 96 provided at one end with a downward and rearwardly extending bracket 98 that is connected to the shaft 94 for supporting the rear end portion of said pan-like elements. The forward end of the pan-like elements are provided with an arcuate segmental portion that is wrapped about a roller bearing member 99 which, in turn, is mounted upon the shaft 94. The pan-like elements 95 with their rollers 93 constitute the conveyors which move the waste material through the first and second stages of the digestor compartment, and said conveyors are adapted to be driven by suitable motors carried by the digestor compartment for moving the pan-like conveyor elements 95 over suitable head pulleys disposed at the respective ends of the digestor compartment. The arcuate-shaped portion 96 of the pans 95 are maintained in spaced relation with the forward end of the next adjacent pan by the brackets 98 so as to provide an air passageway between adjacent pans whereby air is able to move around and through the waste material on the conveyor.

The waste material is delivered by the conveyor 89 to the entrant end of the digestor compartment where it is discharged and conveyed to a receptacle or hopper 58 which has a bucket elevator 59 associated therewith for moving and delivering the waste material to a conveyor disposed within the top portion of a second digestor compartment. The conveyor positioned within the second digestor compartment is identical in all respects to the conveyor 60 disposed in the upper portion of the first digestor compartment, and, in addition, a conveyor in the lower portion of the second digestor compartment is identical to conveyor 89 in the lower portion of the first digestor compartment. Thus, the waste material that is being composed is subjected to the same treatment in the digestor compartment that was imparted to the material in the first digestor compartment. The composting material is delivered from the second digestor compartment to a third digestor compartment as in each compartment the composting material is subjected to two periods or stages of fermentation so that it will have been moved through six stages or periods of fermentation after being discharged from the third digestor compartment.

The conveyor 89 positioned within the lower portion of the third digestor compartment has associated with its discharge end a rotatably driven agitator consisting of four segmenal blade members 102 radiating from a common shaft with the ends of said blade members being formed with curved or scooped end portions 103. The blade members 102 are configured to engage the waste material on the conveyor 89 for propelling said material onto and against a rotatably driven spoked member 104 positioned at the end of the conveyor 89. The spoked members 104 not only receive the composting material froh the members 102 but also receive any of said material that may still be on the conveyor 89 for thoroughly agitating and aerating said material to insure that same is discharged from the third digestor compartment in a relatively loose and fluffy state or condition from whence it is delivered to a grinder 105. The composing material is thoroughly pulverized by the grinder 105 after which it is delivered by any suitable means to a chute 108 for delivery to a rotatably driven elongated drum 109 of a spin or primary drier 106.

The drum 109 has positioned therein a stationary stirrer element which is composed of a vertically extending conduit 110 having a plurality of radiating arms 111 for delivering to the interior of the drum 109 suitable heated air from a blower 112 which has associated therewith a heating unit 114. Thus, air is drawn through the heating unit 114 by the blower 112 from whence it is delivered to the conduit 110 and finally discharged from the ends of the radiating arms 111 into and through the composting material as it is delivered to said drum and moves from the top of the drum to the bottom thereof under gravity feed. The drum 109 is provided with a plurality of orifices 115 which are covered by screening 116 so as to permit the egress of any moisture emanating from the composting material through the action of the heated air being discharged from the arms 111. The drum 109 is enclosed within a housing 117 that is disposed in spaced relation with said drum so as to collect any moisture that may be driven or forced through the screened orifices 115 by the heated air emanating from the arms 111. The housing 117 has mounted thereon a motor 118 which has a pinion gear 119 secured to the end of its drive shaft for engagement with a ring gear 120 that is affixed to the housing drum 109 for rotating said drum and thereby aiding and abetting the movement of the composting material from the top to the bottom of the drum. The conduit 110 has mounted on the lower portion thereof within the drum 109 an auger 121 which imparts a rotative movement to the composting material as it moves to the bottom of the drum to further insure the extraction of any moisture from said material. Any and all moisture that is collected between the drum 109 and the housing 117 is conducted to a discharge outlet passage 122.

The composting material is delivered from the spin drier 106 to a secondary drier 125, which drier is provided with suitable electric heating means to further insure the extraction of any and all moisture from the composting material. From the secondary drier 125 the composting material is delivered to a suitable screening member 126 which separates the composting material having a uniform size from composting material that is slightly over-sized, and said uniform-sized composting material is then conveyed to a grinder 127 from whence the final product is delivered. The over-sized composting material is ejected by the screening member 126 and recycled to the grinder 105 for a further grinding operation and a further spin-drying in the primary drier as well as a drying operation in the secondary drier and is then moved once again through the screening member 126 in conjunction with additional composting material that is delivered thereto.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as claimed herein.

I claim:
1. A process for composting fermentable organic and inorganic waste material which comprises:
grinding said materials to produce particles of substantially uniform size;
mixing said ground particles within a temperature-controlled atmosphere while adding preheated liquid thereto to produce a temperature-controlled mass while initiating fermentation thereof;
delivering said temperature-controlled mass into one end of an elongated enclosure;

forming and shaping said mass for fermentation thereof while moving said mass towards the other end of said enclosure, then simultaneously aerating and agitating said mass with the addition of moisture thereto;
reforming said mass within said enclosure to permit the free circulation of air through and about said mass while moving same within the enclosure;
agitating and aerating said mass by fluffing and breaking same up to produce new areas for fermentation thereof at a rate determined by the fermentation temperature of said mass;
reforming said mass within said enclosure to permit the free circulation of air through and about said mass while moving same within the enclosure;
agitating and mixing said mass to relocate and rearrange the particles to produce new areas for fermentation thereof;
forming and shaping said mass for fermentation thereof while moving said mass towards the other end of said enclosure;
further agitating and aerating said mass at a rate determined by the fermentation temperature of said mass until said mass is fermented to a desired degree; and
discharging said treated mass.

2. A process for composting fermentable organic and inorganic waste material which comprises:
grinding said materials to produce particles of substantially uniform size;
mixing said ground particles within a temperature-controlled atmosphere while adding a preheated liquid to initiate fermentation in a temperature-controlled mass;
delivering said mass into one end of an enclosure;
forming and shaping said mass to permit the free circulation of air through and about said mass while moving said mass towards the other end of said enclosure, then simultaneously aerating and shredding said mass for fermentation thereof;
reforming and shaping said mass for the aeration thereof at a rate determined by the fermentation temperature of said mass while moving said mass within the enclosure;
agitating and mixing said mass to rearrange and relocate the particles to produce new areas for fermentation while moving said mass towards the other end of said enclosure;
further agitating and mixing said mass upon reversing the direction of movement of said mass within said enclosure for fermentation thereof;
reforming and shaping said mass for the aeration thereof at a rate determined by the fermentation temperature of said mass while moving said mass towards said one end of said enclosure;
and discharging said treated mass from said one end of said enclosure.

3. A process for composting fermentable organic and inorganic waste material which comprises:
grinding said materials to produce particles of substantially uniform size;
mixing said ground particles within a temperature-controlled atmosphere while adding a preheated liquid to initiate fermentation in a temperature-controlled mass;
delivering said mass into one end of an enclosure;
forming and shaping said mass to permit the free circulation of air through and about said mass while moving said mass towards the other end of said enclosure and through a first stage of fermentation, then simultaneously aerating and shredding said mass for fermentation thereof;
agitating said mass by fluffing and breaking same up to produce new areas for fermentation thereof while moving said mass through said first stage of fermentation;
reforming and shaping said mass while moving same through said first stage of fermentation, then aerating said mass at a rate determined by the fermentation temperature of said mass;
agitating and mixing said mass to rearrange and relocate the particles to produce new areas for fermentation, then forming and shaping said mass for fermentation thereof while moving said mass through said first stage of fermentation;
further agitating and mixing said mass upon reversing the direction of movement of said mass and delivering same to a second stage of fermentation while moving same towards said one end of the enclosure;
agitating and mixing said mass to rearrange and relocate the particles to produce new areas for fermentation while moving said mass through said second stage of fermentation;
further agitating said mass by fluffing and breaking same up to produce new areas for fermentation while moving said mass through said second stage of fermentation;
reforming and shaping said mass while moving same through said second stage of fermentation, then aerating said mass at a rate determined by the fermentation temperature of said mass; and
discharging said treated mass from said second stage of fermentation at said one end of said enclosure.

4. The process as set forth in claim 3 wherein said treated mass discharge from said one end of said enclosure is delivered to a second enclosure for moving said mass through a third and fourth stage of fermentation in the same manner as said mass is moved through the first and second stages of fermentation;
discharging said mass from said second enclosure and delivering said mass to a third enclosure for moving said mass through a fifth and sixth stage of fermentation in the same manner as said mass is moved through said first and second stages of fermentation;
discharging said mass from said third enclosure and grinding said mass for delivery to a drier; and
screening said dried mass and grinding said screened particles to obtain a finished product.

References Cited

UNITED STATES PATENTS

| | | | |
|---|---|---|---|
| 2,954,285 | 9/1960 | Carlsson et al. | 71—9 |
| 2,977,214 | 3/1961 | McLellan | 71—64 |
| 3,113,014 | 12/1963 | Foth | 71—9 |
| 3,138,447 | 6/1964 | Eweson | 71—9 |
| 3,142,557 | 6/1964 | MacDuffie et al. | 71—9 |

DONALL H. SYLVESTER, *Primary Examiner.*

R. D. BAJEFSKY, *Assistant Examiner.*

U.S. Cl. X.R.

71—11, 14, 25